(12) United States Patent
Mueller (10) Patent No.: US 8,320,566 B2
(45) Date of Patent: Nov. 27, 2012

(54) METHOD AND APPARATUS FOR PERFORMING CONSTELLATION SCRAMBLING IN A MULTIMEDIA HOME NETWORK

(75) Inventor: Arndt Mueller, San Diego, CA (US)

(73) Assignee: Entropic Communications, Inc., San Diego, CA (US)

( * ) Notice: Subject to any disclaimer, the term of this patent is extended or adjusted under 35 U.S.C. 154(b) by 372 days.

(21) Appl. No.: 12/580,227

(22) Filed: Oct. 15, 2009

(65) Prior Publication Data

US 2010/0098257 A1 Apr. 22, 2010

Related U.S. Application Data

(60) Provisional application No. 61/105,942, filed on Oct. 16, 2008, provisional application No. 61/144,061, filed on Jan. 12, 2009.

(51) Int. Cl.
*H04L 9/00* (2006.01)
(52) U.S. Cl. .......................... 380/268; 380/287; 370/480
(58) Field of Classification Search .................. 380/268, 380/287; 370/480
See application file for complete search history.

(56) References Cited

U.S. PATENT DOCUMENTS

| | | | |
|---|---|---|---|
| 5,349,582 A | 9/1994 | Bisdikian et al. | |
| 6,956,865 B1 | 10/2005 | Khaunte et al. | |
| 7,054,296 B1 | 5/2006 | Sorrells et al. | |
| 7,310,522 B2 * | 12/2007 | Geile | 455/424 |
| 7,333,449 B2 * | 2/2008 | Zimmermann et al. | 370/321 |
| 2004/0037214 A1 * | 2/2004 | Blasco Claret et al. | 370/203 |
| 2005/0287964 A1 | 12/2005 | Tanaka et al. | |
| 2007/0133386 A1 | 6/2007 | Kim et al. | |
| 2008/0013473 A1 | 1/2008 | Proctor, Jr. et al. | |
| 2008/0076432 A1 | 3/2008 | Senarath et al. | |
| 2009/0106810 A1 * | 4/2009 | Stoye et al. | 725/131 |
| 2009/0129317 A1 * | 5/2009 | Che et al. | 370/328 |

FOREIGN PATENT DOCUMENTS

WO 2008/039951 A1 4/2008

OTHER PUBLICATIONS

Examination Report for App No. GB1104519.2, completed May 23, 2012.

* cited by examiner

*Primary Examiner* — Samson Lemma
(74) *Attorney, Agent, or Firm* — Bruce Greenhaus; Sheppard, Mullin, Richter & Hampton LLP (57) ABSTRACT

Systems and methods are provided that allow multiple transmitting network devices to transmit under an orthogonal frequency divisional multiple access (OFDMA) mode to a receiving network device. The multiple transmitting network devices may be configured to perform constellation scrambling on the symbols they will be transmitting using a predetermined scrambling sequence. They may be further configured to synchronize their use of the sequence, for example, by advancing the sequence for each available subcarrier, such that the receiving device may view the payload as if it were sent by a single transmitter. Accordingly, these multiple transmissions may be descrambled using only one instance of a sequence generator.

18 Claims, 12 Drawing Sheets

METHOD AND APPARATUS FOR PERFORMING CONSTELLATION SCRAMBLING IN A MULTIMEDIA HOME NETWORK

CROSS-REFERENCE TO RELATED APPLICATIONS

This application claims priority from Provisional Application Ser. No. 61/105,942, filed on Oct. 16, 2008 and this application claims priority from Provisional Application Ser. No. 61/144,061, filed on Jan. 12, 2009, each which is hereby incorporated herein by reference in its entirety.

TECHNICAL FIELD

The disclosed method and apparatus relates generally to communication networks, and more particularly, some embodiments relate to constellation scrambling in orthogonal frequency division multiple access networks.

DESCRIPTION OF THE RELATED ART

With the many continued advancements in communications and data transfer technology, more and more devices are being introduced in both the consumer and commercial sectors with advanced, high bandwidth communications capabilities. Additionally, advances in processing power and low-power consumption technologies have led to the proliferation of communications capabilities in various products on a widespread basis.

For example, communication networks are now commonplace in many home and office environments. Such networks allow various previously independent devices to share data and other information to enhance productivity or simply to improve their convenience to the user. Against this backdrop, there is a growing demand for the ability to connect content devices (e.g., televisions, DVD players and recorders, digital cameras, speakers, video cameras, etc.), computing devices, I/O devices, home appliances and modems.

Home entertainment networks are typically provided in one of two topologies. The first is an Access topology, which can be best analogized to a tree structure wherein a base node communicates with nodes in its branches, but branch nodes do not typically communicate directly with other branches. The second is a Mesh topology in which any node can communicate directly with any other node in the network. Access topologies are typically found in apartment or office settings where a master node at the 'source' is used to distribute data to a plurality of downstream nodes (e.g., to the various apartments in an apartment building) and the downstream nodes (e.g., apartments) do not need to share content with one another. Mesh topologies, on the other hand, might be more typically found in a home environment where, although there may be a common source of broadband data (e.g., the main cable feed into the home), the homeowners may wish to share content originating from a device in one room with other devices in other rooms in their home.

To address the growing demand for a digital home networking market, a consortium of industry leading companies formed the Multimedia over Coax Alliance (MoCA™). MoCA has provided a technical standard (referred to as "MoCA") which defines a protocol for distributing digital entertainment over the available bandwidth on coaxial cable previously installed in households for cable or satellite TV service. The initial MoCA standard was approved in February 2006, and routers with built-in MoCA capabilities (i.e., that conform to the MoCA standard), MoCA set-top boxes and MoCA adapters followed shortly thereafter. Accordingly, one Mesh topology is defined by the MoCA standard.

Architects of these and other networks, and indeed communications channels in general, have long struggled with the challenge of managing multiple communications from various devices across a limited channel. Accordingly, network architects have come up with various solutions to arbitrate disputes or otherwise allocate bandwidth among the various communicating devices, or clients, on the network. Schemes used in well known network configurations such as token rings, Ethernet, and other configurations have been developed to allow sharing of the available bandwidth.

BRIEF SUMMARY

According to various embodiments of the disclosed method and apparatus, systems and methods are provided that allow multiple transmitting network devices to transmit under a orthogonal frequency divisional multiple access (OFDMA) mode to a receiving network device. The multiple transmitting network devices may be configured to perform constellation scrambling on the symbols they will be transmitting using a predetermined scrambling sequence. They may be further configured to synchronize their use of the sequence, for example, by advancing the sequence for each available subcarrier, such that the receiving device may view the payload as if it were sent by a single transmitter. Accordingly, these multiple transmissions may be descrambled using only one instance of a sequence generator.

In one embodiment of the disclosed method and apparatus, a network is configured to operate in an OFDMA mode that aggregates Reservation Requests from multiple (up to 16) nodes which simultaneously transmit their payload symbols destined for a network coordinator (NC). Each transmitter utilizes only a subset of subcarriers, which have been pre-allocated to it on a mutually exclusive basis. By having synchronized carrier frequencies and causing the signals to arrival at the NC at the same time, the orthogonality of the union of all transmitted subcarriers is maintained. That is, the NC receives an apparently normal payload, whose demodulated subcarriers can then be re-partitioned to recover each individual Reservation Request.

According to an embodiment of the disclosed method and apparatus, a communications network system comprises a network device configured to transmit a quadrature amplitude modulated symbol on a subcarrier of a set of subcarriers available for orthogonal frequency division multiple access; wherein the network device is configured to perform a constellation scrambling operation on the quadrature amplitude modulated symbol, the constellation scrambling operation comprising: initializing a sequence generator with a predetermined seed; and, while proceeding through the set of available subcarriers in a predetermined order, advancing the sequence generator for each subcarrier preceding the subcarrier, and using an element of a sequence generated by the sequence generator to scramble the quadrature amplitude modulated symbol.

Other features and aspects of the disclosed method and apparatus will become apparent from the following detailed description, taken in conjunction with the accompanying drawings, which illustrate, by way of example, the features in accordance with embodiments of the disclosed method and apparatus. The summary is not intended to limit the scope of the claimed invention, which is defined solely by the claims attached hereto.

BRIEF DESCRIPTION OF THE DRAWINGS

The disclosed method and apparatus, in accordance with one or more various embodiments, is described in detail with reference to the following figures. The drawings are provided for purposes of illustration only and merely depict typical embodiments or examples of possible embodiments of the disclosed method and apparatus. These drawings are provided to facilitate the reader's understanding of the disclosed method and apparatus and shall not be considered limiting of the breadth, scope, or applicability of the claimed invention. It should be noted that for clarity and ease of illustration these drawings are not necessarily made to scale.

The figures are not intended to be exhaustive or to limit the disclosed method and apparatus to the precise form disclosed. It should be understood that the disclosed method and apparatus can be practiced with modification and alteration, and that the claimed invention should be limited only by the claims and the equivalents thereof.

DETAILED DESCRIPTION

Figure 1:
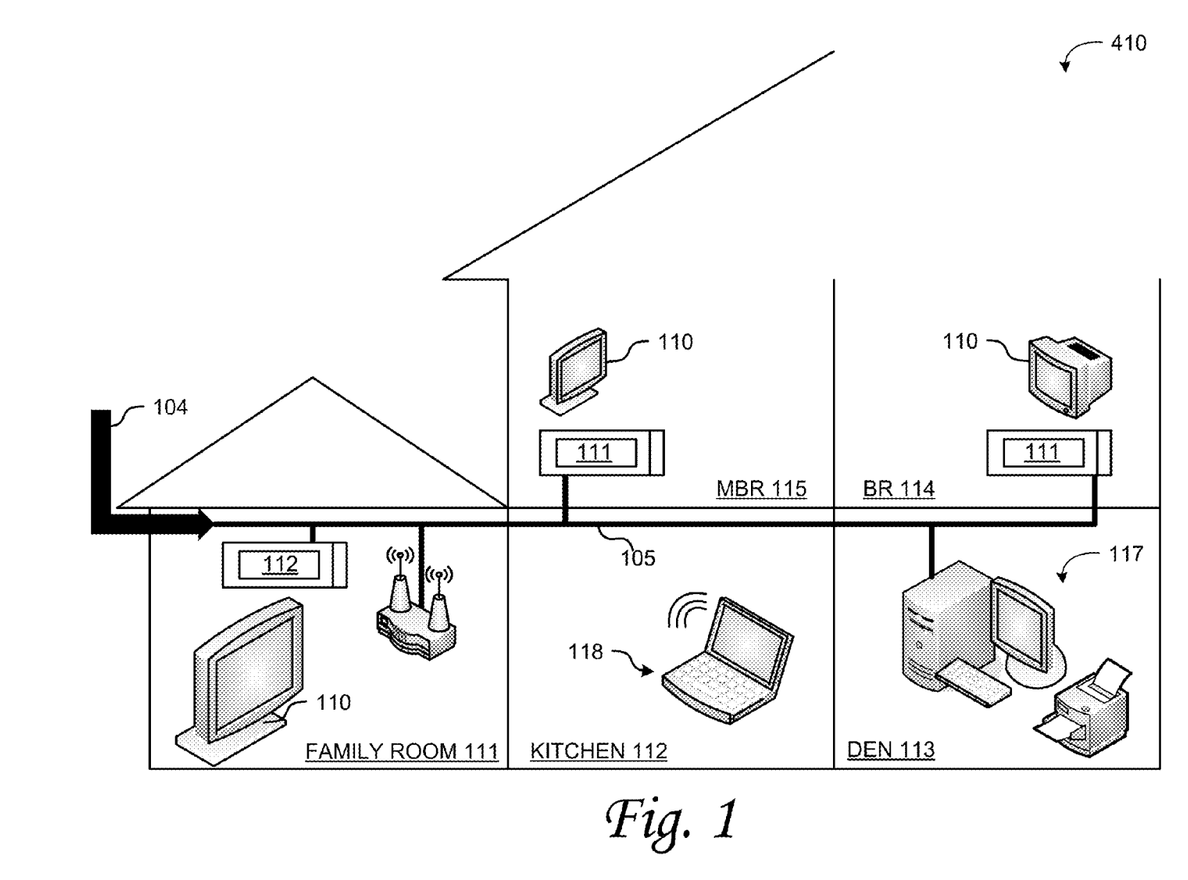
FIG. 1 illustrates an example home network in which embodiments of the disclosed method and apparatus may be implemented.

Before describing the disclosed method and apparatus in detail, it is useful to describe a few example environments in which the disclosed method and apparatus can be implemented. FIG. 1 is a diagram illustrating one such example environment comprising a home cable network. The example of a home environment illustrated in FIG. 1 also includes examples of equipment and other electronic devices or nodes that might be found in a typical home-networking environment, such as a network defined by MoCA. The network of FIG. 1 includes set-top boxes 111 and televisions (TVs) 110 found in the master bedroom 115, the bedroom 114, and the family room 113. Also, a typical home network might include computing systems such as a desktop computing system 117 and peripherals as illustrated in the den 113, and a laptop computer 118 such as that illustrated in the kitchen 112. Other content devices or network devices might also be provided.

Figure 2:
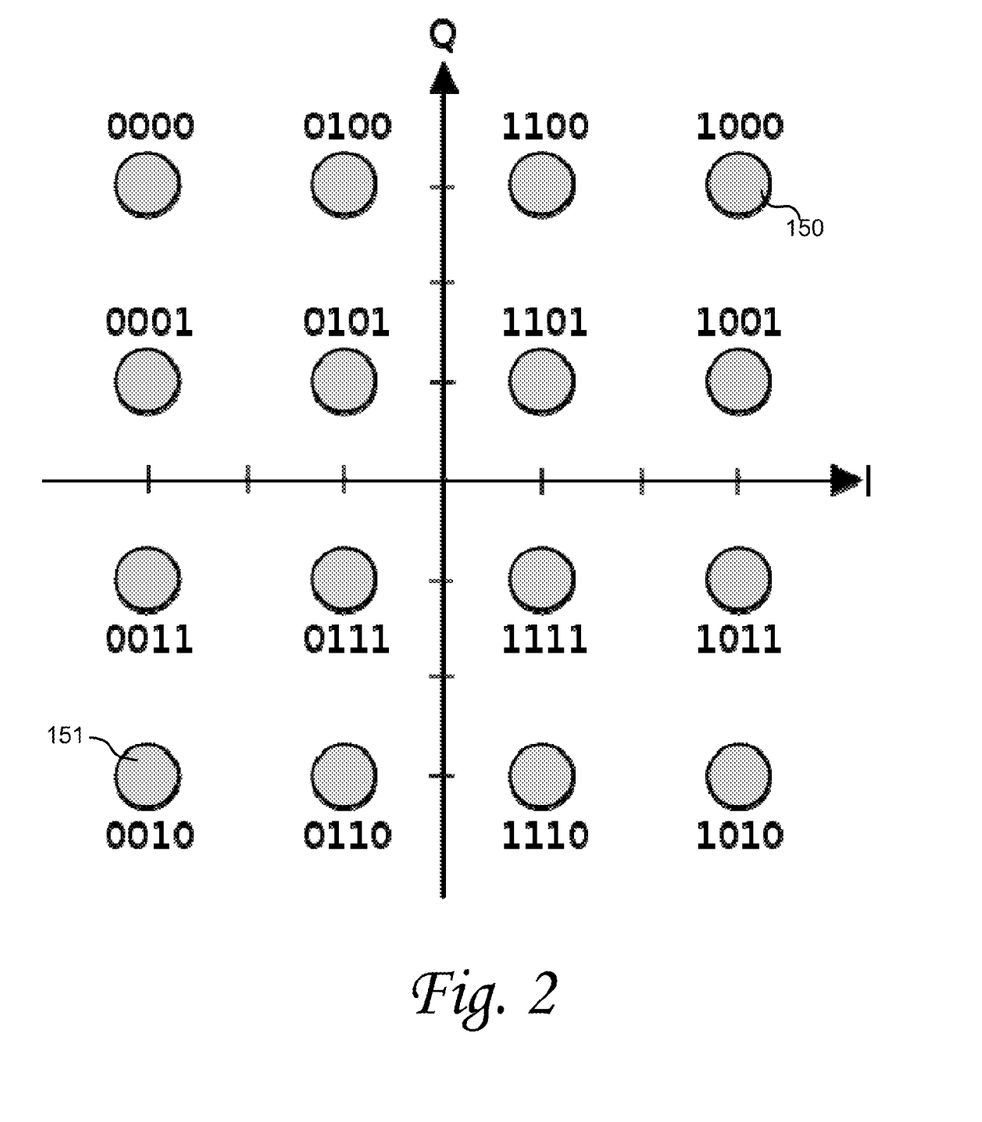
FIG. 2 illustrates a constellation diagram showing a coding scheme for 16-QAM.

In many communications networks, physical layer (PHY) packets are transmitted using orthogonal frequency division multiplexing (OFDM). In OFDM, data is modulated onto a plurality of frequency subcarriers. Each subcarrier is modulated using quadrature amplitude modulation (QAM). In QAM, the phases of two carrier waves at the same frequency are modulated. The two subcarriers are termed the quadrature (Q) component and the in phase (I) component. For example, FIG. 2 illustrates a coding scheme for 16-QAM. As the Figure illustrates, both the quadrature and the in phase components may assume any one of four different phases, for a total of sixteen different symbols. By representing such a coding scheme with Q and I as axes of a graph, a constellation diagram may be obtained. Operations on QAM symbols may then be described in terms of what the operations do to their respective constellation point. For example, rotating point 150 by 180° would map it onto point 151, which is equivalent to multiplying the quadrature component by −1 and the in phase component by −1. As the figure illustrates, a constellation diagram comprising 2 points would be equivalent to binary phase shift keying (BPSK). Although BPSK requires only one carrier wave, references to quadrature amplitude modulation herein will be understood to encompass BPSK unless otherwise stated.

A MoCA network includes a plurality of client nodes, such as TVs 110, set top boxes 111 and computers 117, 118. It should be noted that TVs, 110, set top boxes 111 and computers 117, 118 are configured with a communication device that allows these devices to operate as a client node on the MoCA network. Initially, upon setting up a MoCA network, one of the client nodes is automatically selected to be a network coordinator (NC). For the purpose of establishing a system to allocate network bandwidth, the NC schedules times during which communication occurs over the network. The NC communicates the schedule to each client node in "Media Access Packets" (MAPs). Each MAP is a packet of information. One MAP is sent by the NC during each "MAP cycle". To enable the NC to perform these scheduling duties, the NC provides an opportunity for network devices to transmit a "Reservation Request" (RR) that comprises a request for a certain amount of bandwidth at a certain time. The required time to receive these RRs grows with the size of the network. For example, if a MAP cycle were 1000 μs, and each RR required 17 μs, then to separately receive RRs from the 15 non-controlling nodes in a 16 node network would require 255 μs or about 25% of the channel time.

From time-to-time, the disclosed method and apparatus refers to this example environment. The description in terms of this environment is provided to allow the various features and embodiments of the disclosed method and apparatus to be portrayed in the context of an particular application as one example. After reading this description, it will become apparent to one of ordinary skill in the art how the disclosed method and appraratus can be implemented in different and alternative environments.

Figure 3:
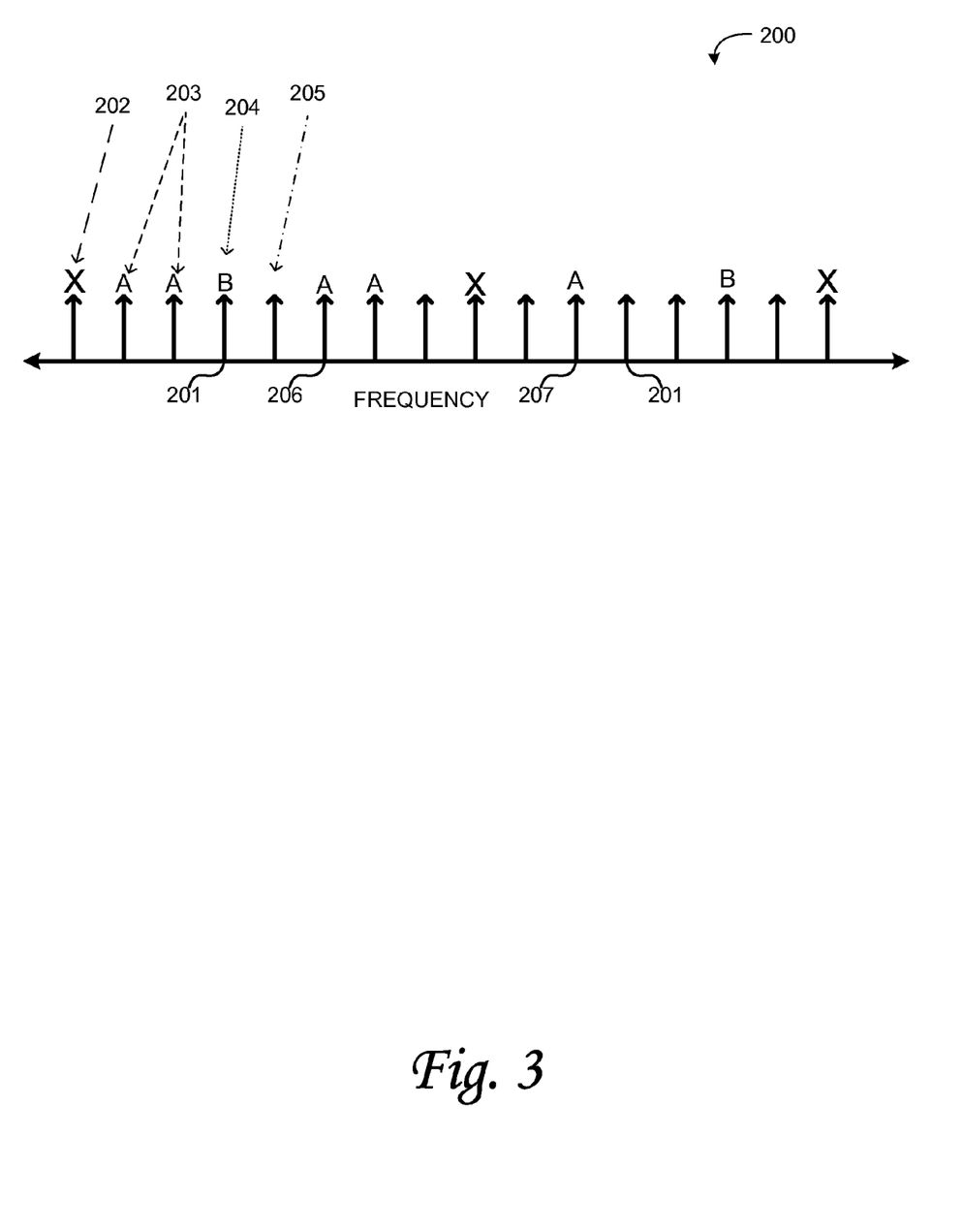
FIG. 3 illustrates a frequency band that may be used for OFDMA in accordance with an embodiment of the disclosed method and apparatus.

FIG. 3 illustrates a frequency band that may be used for OFDMA in accordance with an embodiment of the disclosed method and apparatus. In this frequency band, a plurality of frequency subcarriers 201 or "tones" (represented by upwards-pointing arrows) are provided for use in OFDM communications. In some embodiments, a portion of the tones 202 (represented with an 'X' above the tone) may be determined to be unavailable for OFDM communications, for example because the signal falls outside of the system's defined available bandwidth or reservation of the subcarrier for other uses. Accordingly, a subset of subcarriers within the frequency band may be available subcarriers for OFDM (the subcarriers not marked with an 'X'). In an OFDMA communications environment, further subsets of the available subcarriers are assigned to network nodes for use in OFDMA communications. These networks nodes may then communicate simultaneously on their assigned subcarriers. For example, a portion of the subcarriers assigned to node 'A' 203 are labeled with an 'A' and the portion of the subcarriers assigned to node 'B' 204 are labeled with a 'B', while subcarriers that remain available for another node 205 are unlabeled. In some embodiment, the partitioning of the available subcarriers into node-specific portions may be undertaken by a network coordinator or controller, for example during a node admission process. In other embodiments, for example those lacking a network controller, the allotment of the available subcarriers to the network nodes may be mutually negotiated.

In some communications networks, OFDMA may be used for all transmission types, for example to allow a large number of network devices to share a common communications medium, such as in a sensor network. In other communications networks, OFDMA may be used for particular transmission types. For example, OFDMA may be used for network transmissions that are required from participating network nodes for scheduling and house keeping purposes. Using MoCA networks as an example, OFDMA may be used to transmit RRs during an RR period of a MAP cycle, thereby reducing the duration of the RR period and freeing time for other network communications.

In some communications networks, the different modulation schemes may be assigned to the different available subcarriers. For example, different schemes may be used because communications on the different subcarriers may have varying propagation or signal characteristics. For example, a first subcarrier 206 may provide a signal-to-noise ratio (SNR) that can support 1024-QAM, while a second subcarrier may have a large degree of noise, or a reduced allowed signal strength, such that it can maintain only 2-QAM, (i.e., BPSK). Accordingly, in some embodiments, rather than requiring each subcarrier to have the same modulation scheme, different subcarriers may be allocated different modulation schemes. For example, the network medium may be periodically profiled and the available subcarriers may be assigned different QAM modulation schemes according to these profiles.

In such an embodiment, even if OFDMA is reserved for house-keeping or maintenance data exchanges, such as the transmission of RRs, where packet length will be relative constant between different nodes, different nodes may still require different numbers of subcarriers. For example, if the subcarriers assigned to B 204 for OFDMA support a higher QAM modulation rate, such as 512-QAM, while the subcarriers assigned to A 203 do not support such high rates, then A may be assigned a greater number of subcarriers, as illustrated.

Figure 4:
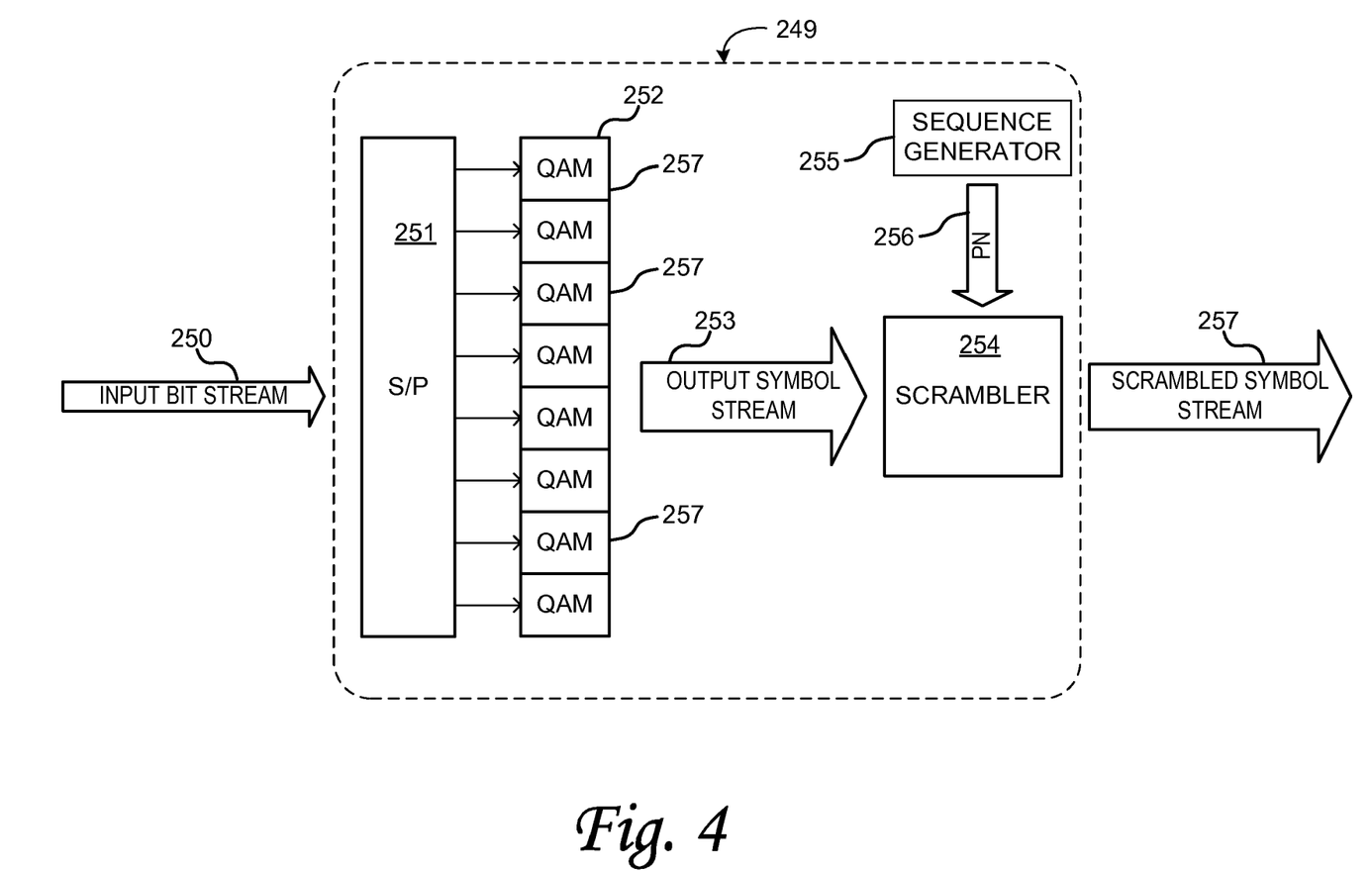
FIG. 4 illustrates an OFDM coding module that may be used in accordance with an embodiment of the disclosed method and apparatus.

FIG. 4 illustrates an OFDM coding module that may be used in accordance with an embodiment of the disclosed method and apparatus. In this implementation, a coding module 249 receives an input bit stream 250. Input bit stream 250 may represent a PHY packet, for example. The coding module 249 transforms the serial bit stream to a parallel stream using serial-to-parallel module 251. This parallel stream is then presented to a QAM module 252, which may comprise a plurality of QAM coding modules 257. In some embodiments, a QAM coding module 275 may be present for each available subcarrier. Accordingly, in these embodiments, when the network node communicates using OFDMA, it may not use all available QAM modules. Instead, the network node may use only the QAM modules that correspond to its assigned subset of the available subcarriers. In other embodiments, the serial to parallel module 251 and the multiple QAM modules 257 are replaced with a single QAM coding module that sequentially performs QAM coding of the bit stream 250 onto the used subcarriers.

After QAM coding, an output symbol stream 253 comprising a plurality of QAM symbols, and together comprising an OFDM symbol, is provided to a scrambler module 254. The scrambler module 254 uses the output 256 of a sequence generator 255 to perform a constellation scrambling operation on the received QAM symbols, as described below with respect to FIG. 5. In some embodiments, sequence generator module 255 comprises a pseudorandom noise sequence generator and the output 256 comprises a pseudorandom noise sequence. The scrambled symbol stream 257 is then provided for further use by the transmitter.

Figure 5:
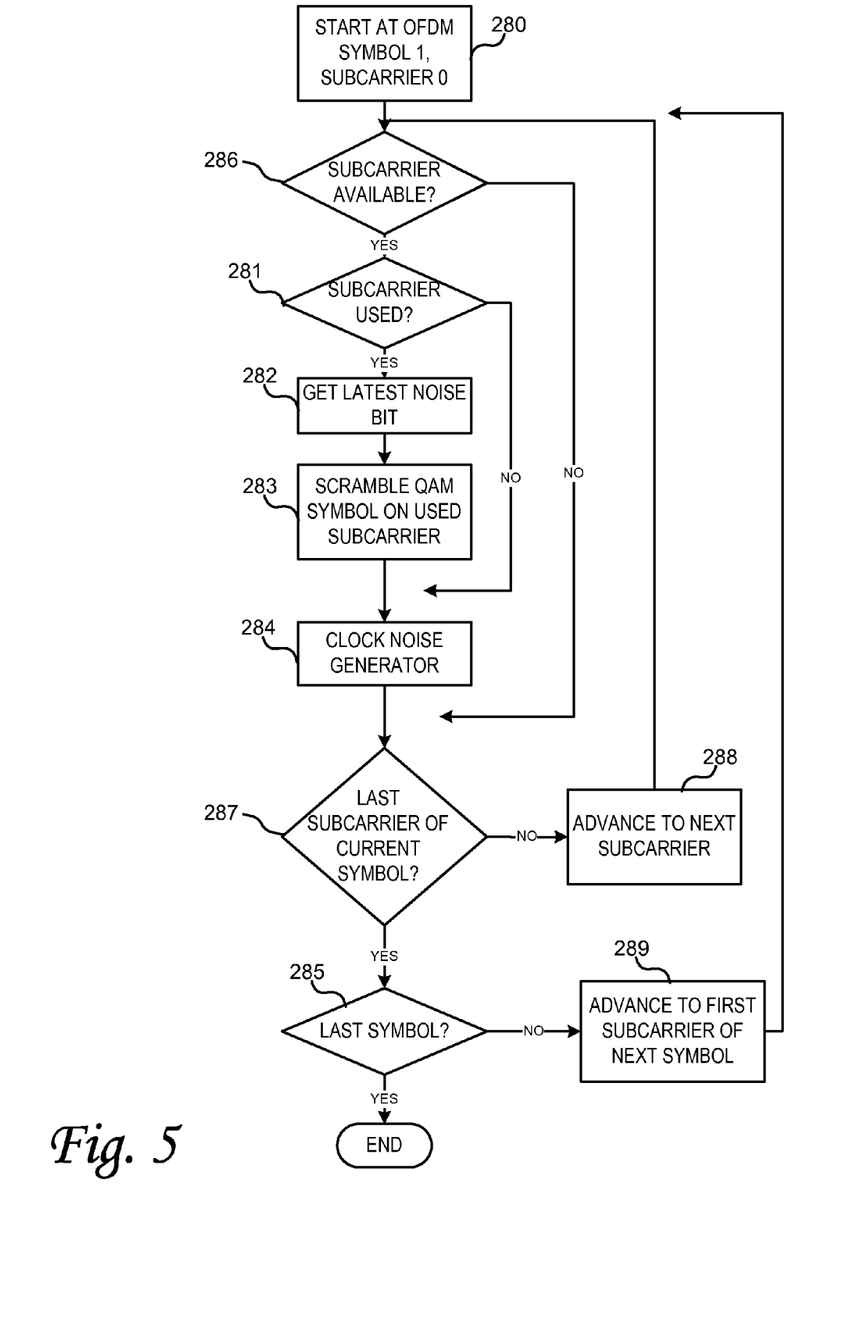
FIG. 5 illustrates a scrambling operation according to an embodiment of the disclosed method and apparatus.

FIG. 5 illustrates a scrambling operation according to an embodiment of the disclosed method and apparatus. In one embodiment, a shared pseudorandom sequence that is used for constellation scrambling is provided to each network device that will be simultaneously transmitting during an OFDMA communications period. In one such embodiment, the pseudorandom sequence is initialized with a common seed, such that each network device generates the same sequence. Furthermore, in accordance with one embodiment, the available subcarriers for OFDMA communications are indexed according to an indexing scheme that is shared among the network nodes. In this embodiment, when the constellation scrambling process begins (STEP 280), beginning with the first OFDM symbol and first subcarrier in the frequency range, a transmitting network device inspects the current subcarrier to determine if the subcarrier is available for OFDMA communications (STEP 286). If the subcarrier is available, then the device determines whether the current subcarrier is being used by the device for OFDMA communications (STEP 281) (i.e., the subcarrier will be transmitting a QAM symbol on the current subcarrier). If so, then the node obtains the latest element of the pseudorandom sequence (STEP 282) and scrambles the QAM symbol on the used subcarrier (STEP 283) using the obtained element of the pseudorandom sequence. After STEP 283, or after STEP 281 if the subcarrier is not used, the device clocks the noise generator to advance she pseudorandom sequence to the next element (STEP 284). In STEP 287, the device determines if the current subcarrier is the last subcarrier of the current symbol. In the illustrated embodiment, this step is performed after STEP 284 if it is determined in STEP 286 that the current subcarrier is not available. If STEP 287 determines that the current subcarrier is not the last subcarrier of the current symbol, then the network devices advances to the next subcarrier (STEP 288) and the method repeats from STEP 286. On the other hand, if the subcarrier is the last subcarrier, then the device determines if current symbol is the last symbol (STEP 285). If not, the device advances to the first subcarrier of the next symbol and the method again repeats from STEP 286. If the current symbol is the last symbol, then all symbols in the message have been scrambled, and the method ends.

Figure 6:
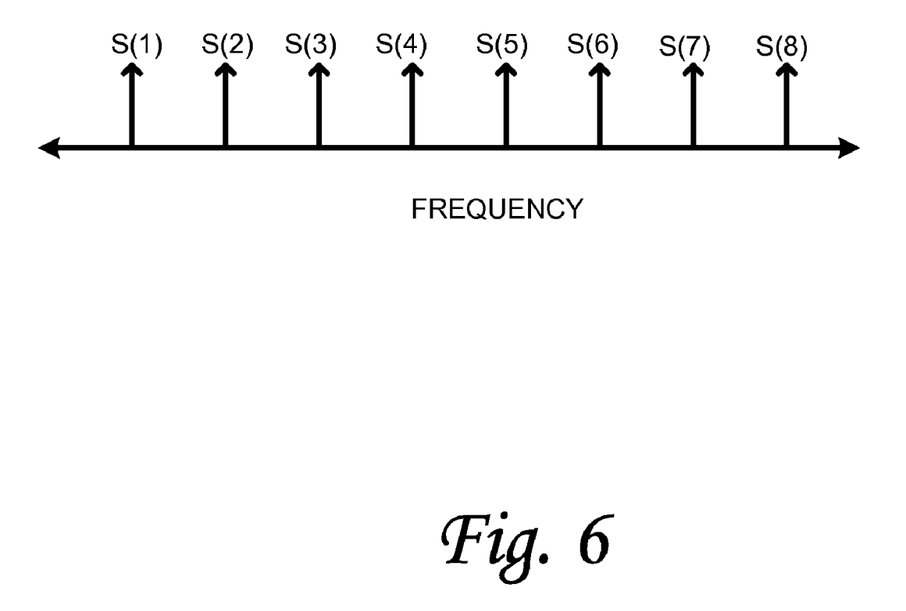
FIG. 6 illustrates a plurality of orthogonal frequency subcarriers having associated elements of a pseudorandom noise sequence.
Figure 7:
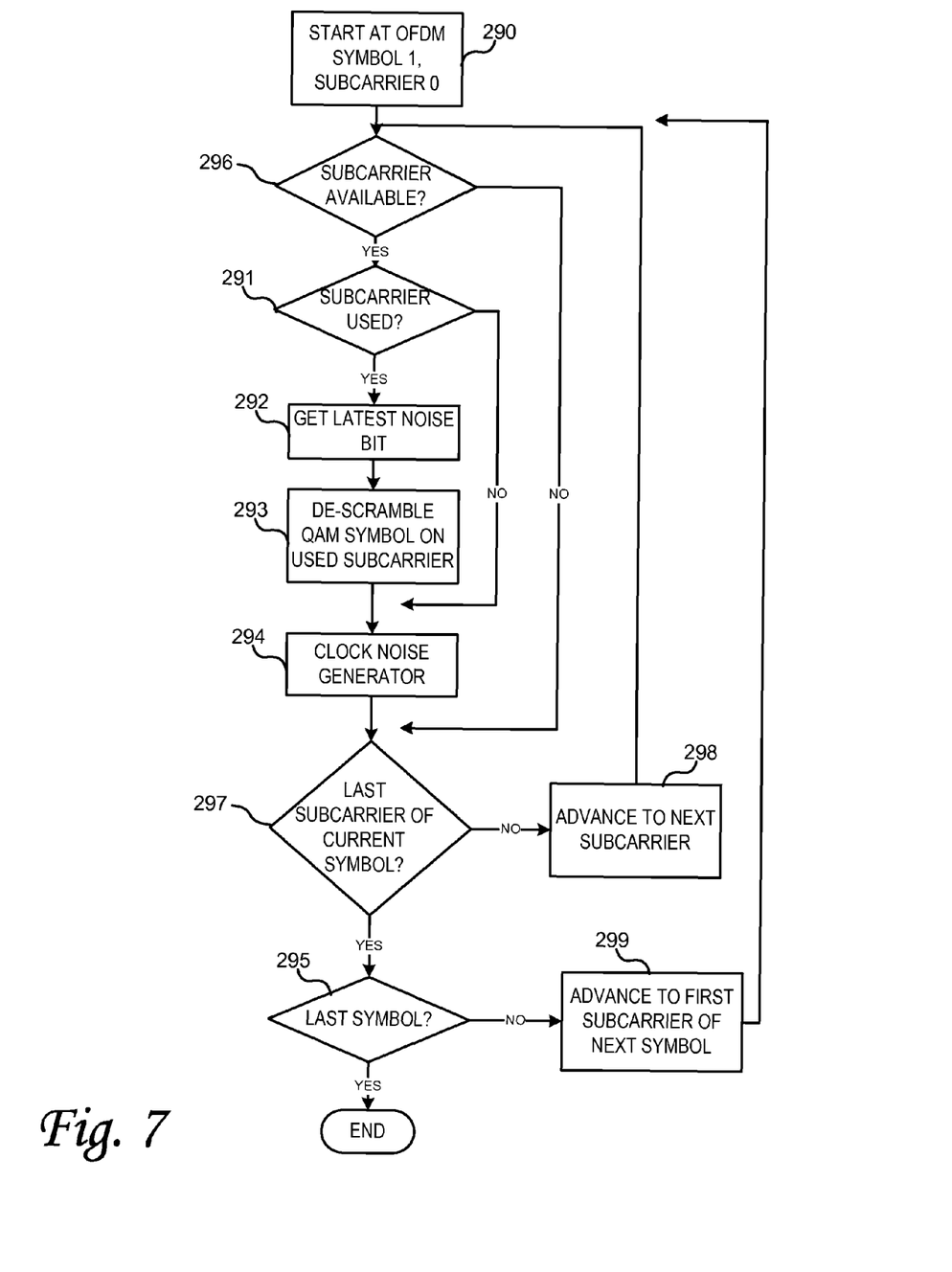
FIG. 7 illustrates a descrambling operation according to an embodiment of the disclosed method and apparatus.

Accordingly, if this method is followed by the network devices that are transmitting using OFDMA, then no two network devices will scramble a symbol using the same pseudorandom sequence element. For example, a network device transmitting on the first subcarrier will be the only device to use the first element of the pseudorandom noise sequence, a network device transmitting on the second subcarrier will be the only device to use the second element of the pseudorandom noise sequence, and so on. This situation is illustrated in FIG. 6, where each available subcarrier effectively has a unique sequence element S(n). This occurs because each network device advances the sequence generator for each available subcarrier, even those that it does not use. In other embodiments, such as illustrated with respect to FIG. 6, each available subcarrier may be assigned Accordingly, the receiving network device sees the transmitted payload as if it were sent by a single transmitter, and it can use a single sequence generator to descramble the received symbols. In some embodiments, the receiving network proceeds in a manner analogous to FIG. 5. This is illustrated in FIG. 7. When this method begins, the receiving network device seeds its sequence generator with the same initial seed as the transmitting network device. Then the decoding method begins (STEP 290), starting with the first received OFDM symbol and the first subcarrier in the frequency band. As described herein, the OFDM symbol on the receiver's side in this embodiment comprises an OFDM symbol that is a combination of a plurality of OFDM symbols that were sent by multiple transmitting devices using OFDMA. Analogously to the scrambling process, the descrambling process inspects the current subcarrier (STEP 296) to determine if it is available for OFDMA, and if so, determines if the subcarrier was used (i.e., carried a QAM symbol) (STEP 291). If the subcarrier is used, then the receiving device obtains the latest bit from the scrambling sequence (STEP 292) and descrambles the QAM symbol on that used subcarrier (STEP 293). If the subcarrier was available but not used in STEP 291, or after descrambling the subcarrier in STEP 293, then the receiving device clocks the noise generator (STEP 294). Continuing the descrambling process, the receiving device proceeds through the subcarriers of the frequency band (STEP 298 and 297), and for each of the OFDM symbols (STEP 299 and 295) in a manner analogous to the process implemented by the transmitting devices. After the method has ended, the receiving network device has descrambled all the received symbols from the plurality of transmitting devices that participated in the OFDMA transmission period. In some embodiments this avoids the requirement that the receiving network device maintain multiple sequence generators, because the receiving network device does not need to maintain a separate sequence generator for each transmitting device in order to descramble each transmitting device's communications. In a particular embodiment, the receiving network device may comprise a network controller, and the QAM symbols received during the OFDMA period may comprise the transmitting devices' RRs. Accordingly, the network controller may then use the requests to schedule an allocation of the bandwidth during an upcoming MAP and transmit responses to the various network devices with their assigned schedules.

Figure 8:
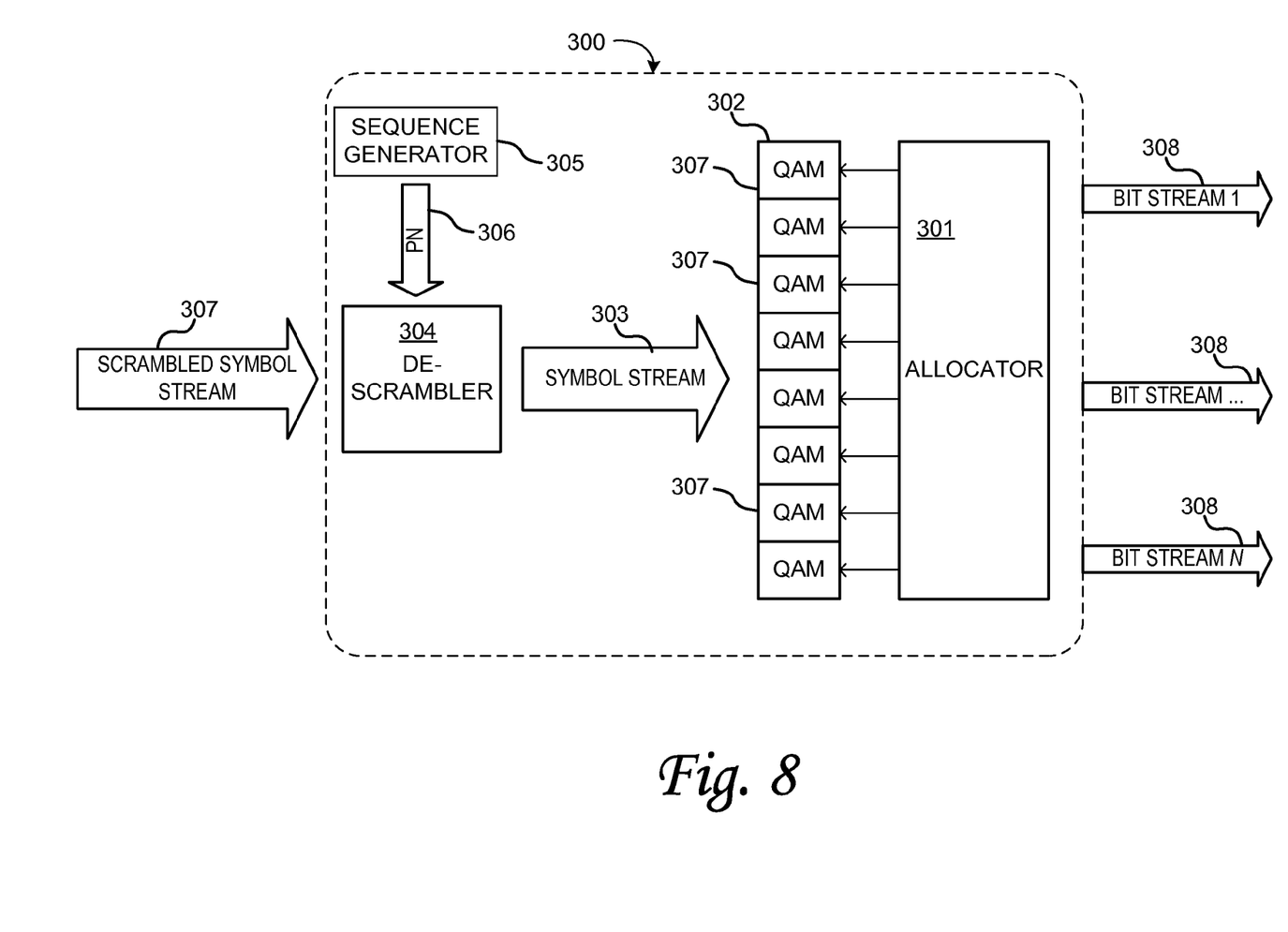
FIG. 8 illustrates a descrambling and decoding module for a network device receiving signals during an OFDMA communications period in accordance with an embodiment of the disclosed method and apparatus.

FIG. 8 illustrates a descrambling and decoding module for a network device receiving signals during an OFDMA communications period in accordance with an embodiment of the disclosed method and apparatus. In this embodiment, the receiving module 300 obtains a scrambled symbol stream 307. Scrambled symbol stream 307 will typically comprise a plurality of QAM symbols transmitted on a corresponding plurality of used subcarriers. These used subcarriers represent the sum of the subcarriers used by the individual transmitting network devices during the OFDMA communications period.

This scrambled symbol stream 307 is provided to a descrambling module 304 for constellation descrambling. As described herein, because the transmitting network devices were able to synchronize their use of a sequence generator, the receiving network device can descramble the received stream 307 using a single sequence generator 305 and output sequence 306. The descrambled symbol stream 303 may then be provided to a plurality of QAM decoders 307, making up a QAM decoding module 302 for decoding. Once the symbols have been decoded, they may be allocated according to their respective transmitting network devices by allocating module 301 and output as a plurality of bit streams 308, with one bit stream per transmitting network device.

Figure 9:
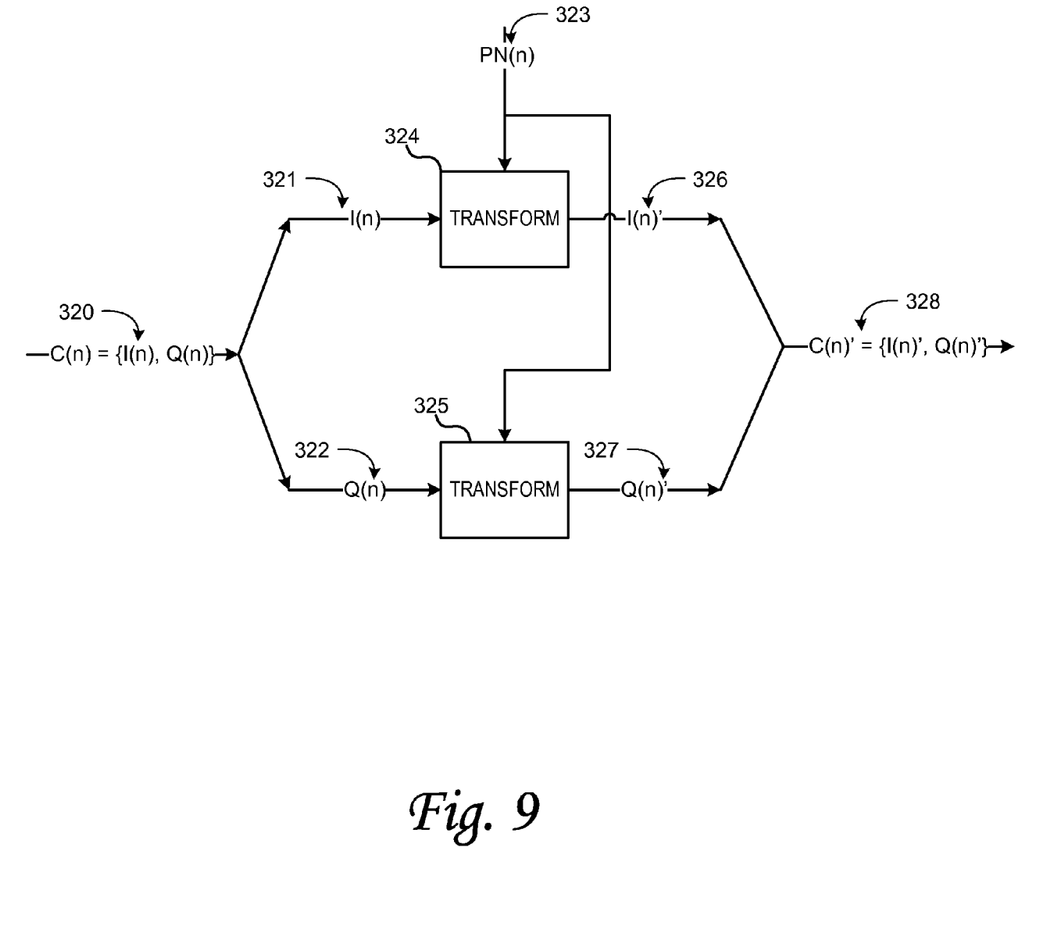
FIG. 9 illustrates a general constellation scrambling procedure that may be implemented in an embodiment of the disclosed method and apparatus.

FIG. 9 illustrates a general constellation scrambling procedure that may be implemented in an embodiment of the disclosed method and apparatus. In this scrambling procedure, a QAM symbol 320 C(n) may be represented by a pair comprising an in phase component and a quadrature component, C(n)={I(n), Q(n)}. In one scrambling process, the in phase component 321, I(n), and the quadrature component 322, Q(n), of the symbol undergo transformations 324 and 325, respectively. In these transformations, a known element of a sequence, such as a pseudo-random sequence 323 may be used such that de-scrambling the symbol comprises an inverse operation using the same sequence element. After transformation, the scrambled symbol C(n)' 328 comprises a scrambled in phase component 326, I(n)', and a scrambled quadrature component 327, Q(n)'.

Figure 10:
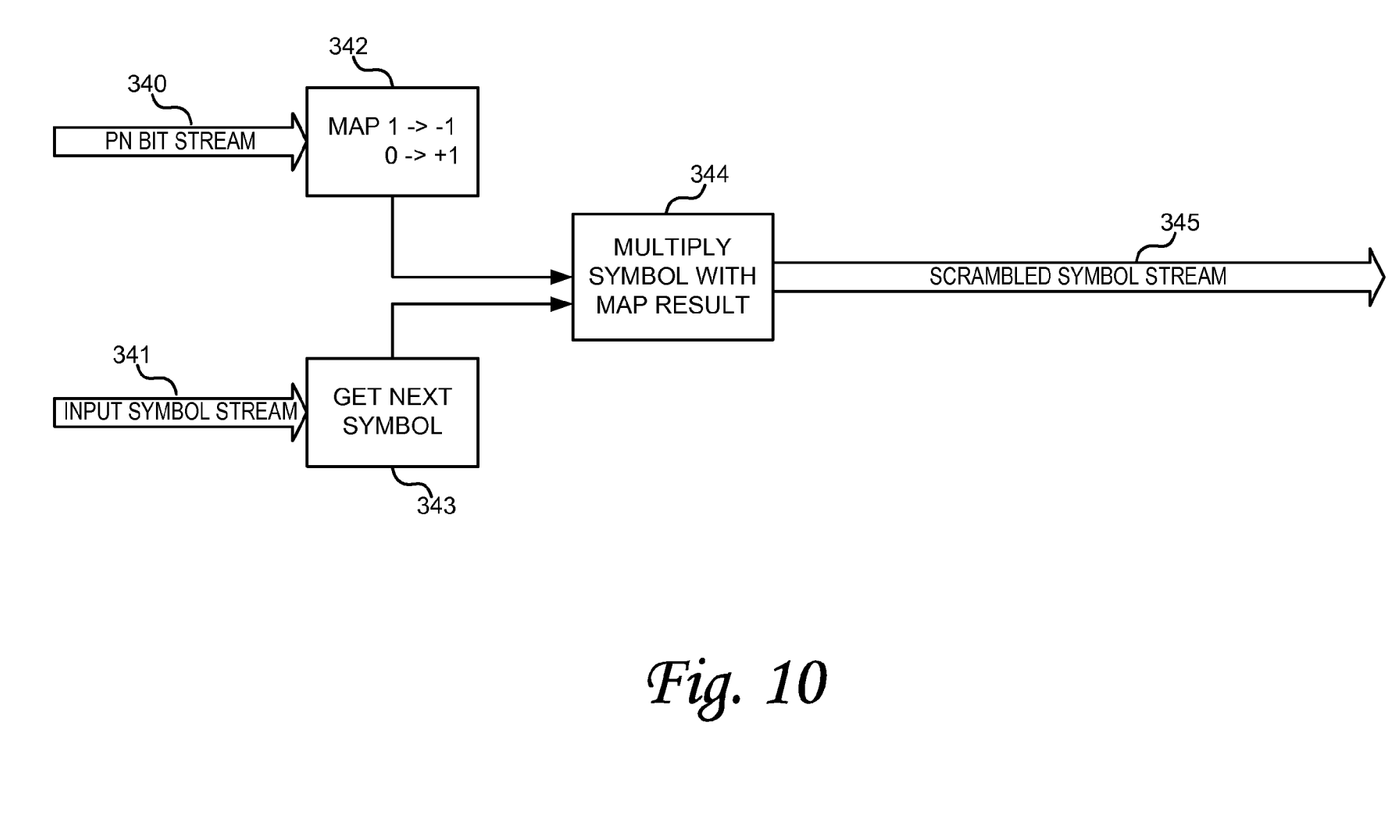
FIG. 10 illustrates a more specific scrambling procedure that may be implemented in an embodiment of the disclosed method and apparatus.

FIG. 10 is a block diagram of the components used to perform a procedure in accordance with one embodiment of the disclosed method and apparatus. In this procedure, a predetermined sequence 340 is provided to a mapping function module 342. In one embodiment, the bit stream 340 comprises a pseudorandom sequence of 1's and 0's. The mapping function module 342 maps 1's to −1's and 0's to 1's, thereby forming a pseudorandom sequence of 1's and −1's. An input symbol stream 341 is coupled to a symbol module 343 to obtain a QAM symbol. A multiplier 344 multiplies the in phase and quadrature components of the symbols by the result of the mapping function 342. If the current element of the pseudorandom sequence is a 1, then the mapping function module 342 returns a −1, and both the in phase and quadrature components are negated, which is equivalent to a 180° rotation (as viewed on a constellation diagram). Moreover, if the current element of the pseudorandom sequence is a 0, then the mapping function module 342 returns 1, resulting in an identity function that leaves the in phase and quadrature components unchanged. The output of the multiplier 344 is a scrambled symbol stream 345. In this particular scrambling process, and other scrambling processes, the scrambling function is its own inverse. In other words, providing the scrambled symbol stream 345 to the symbol module 343 in place of the input symbol stream 341 will result in the original unscrambled stream 341 being output from the multiplier 344, assuming that the pseudorandom sequence 340 is restarted at the original initial value.

Figure 11:
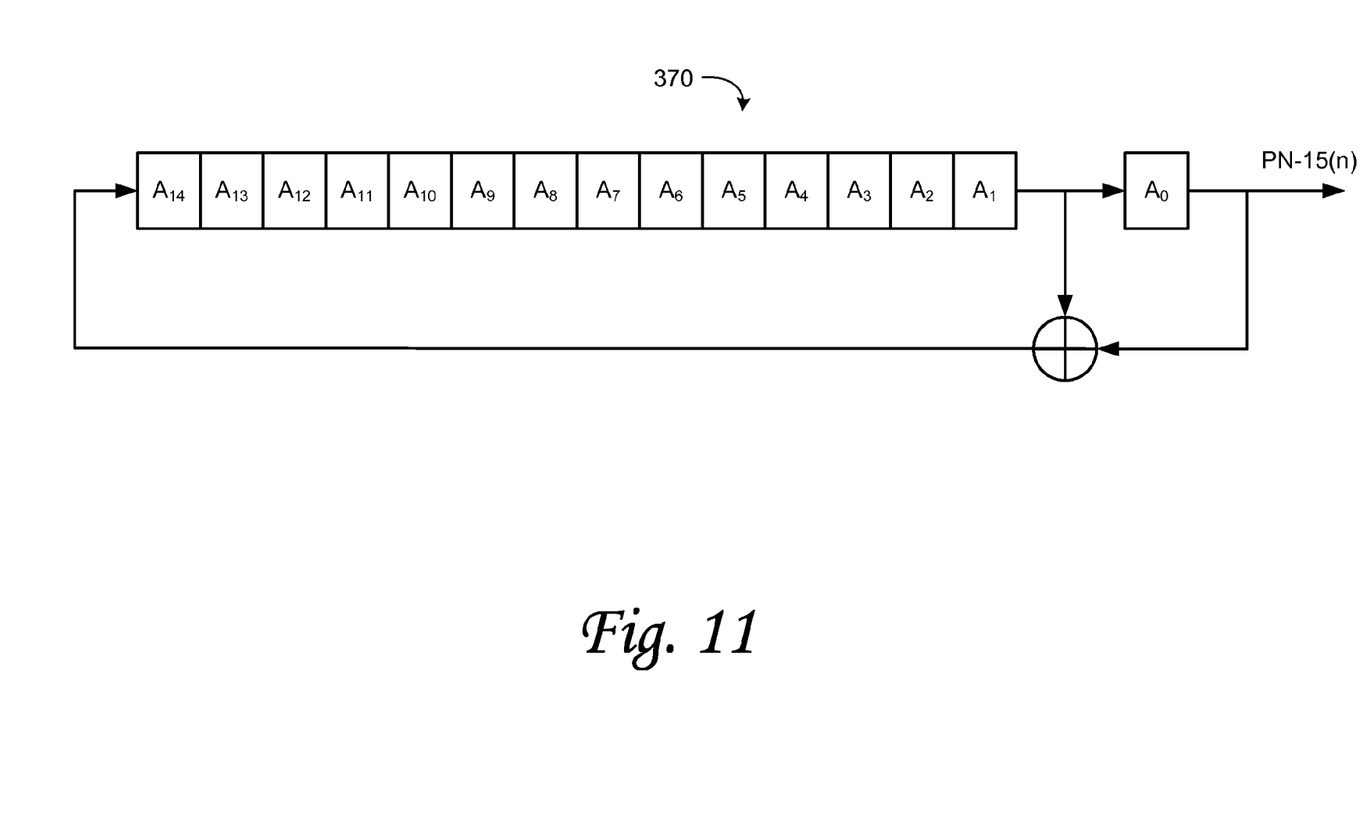
FIG. 11 illustrates a pseudorandom sequence generator that may be implemented in an embodiment of the disclosed method and apparatus.

FIG. 11 illustrates a pseudorandom sequence generator that may be implemented in an embodiment of the disclosed method and apparatus. This figure illustrates a sequence generator for generating a 15th order pseudorandom noise sequence (PN-15(n)), with a generator polynomial $X^{15}+X+1$. In particular embodiments, each network device in a communications network has such a sequence generator. At the beginning of an OFDMA transmissions period, each transmitter initializes the shift register 370 with a predetermined seed. For example, in a particular embodiment the shift register 370 is initialized with the fifteen least significant bits of 0x3EA9. In some embodiments, the current element of the pseudorandom sequence comprises the bit currently occupying $A_0$, for example, the first element of the pseudorandom sequence will comprise the least significant bit of the seed. When the sequence generator is clocked, the shift register generates a new $A_{14}$ as $A_0+A_1$, discards the bit in $A_0$, movies each bit from $A_n$ to $A_{n-1}$. Accordingly, the sequence is generated in a deterministic manner, but can be shown to generate all $2^{15}$ possible 15-bit combinations with an even distribution. Accordingly, the sequence appears to be noise-like as it proceeds.

As described herein, because each transmitting network device participating in the OFDMA period initializes their generator using the same seed, and clocks their generator for each available subcarrier, not merely for their used subcarriers, the various transmitting network devices are able to synchronize their use of the pseudorandom sequence for QAM symbol scrambling. Accordingly, the receiving network device is able to use one sequence generator and descrambling module to descramble all the received QAM symbols during the OFDMA period, rather than needing to maintaining separate descrambling modules for each transmitting network device.

Figure 12:
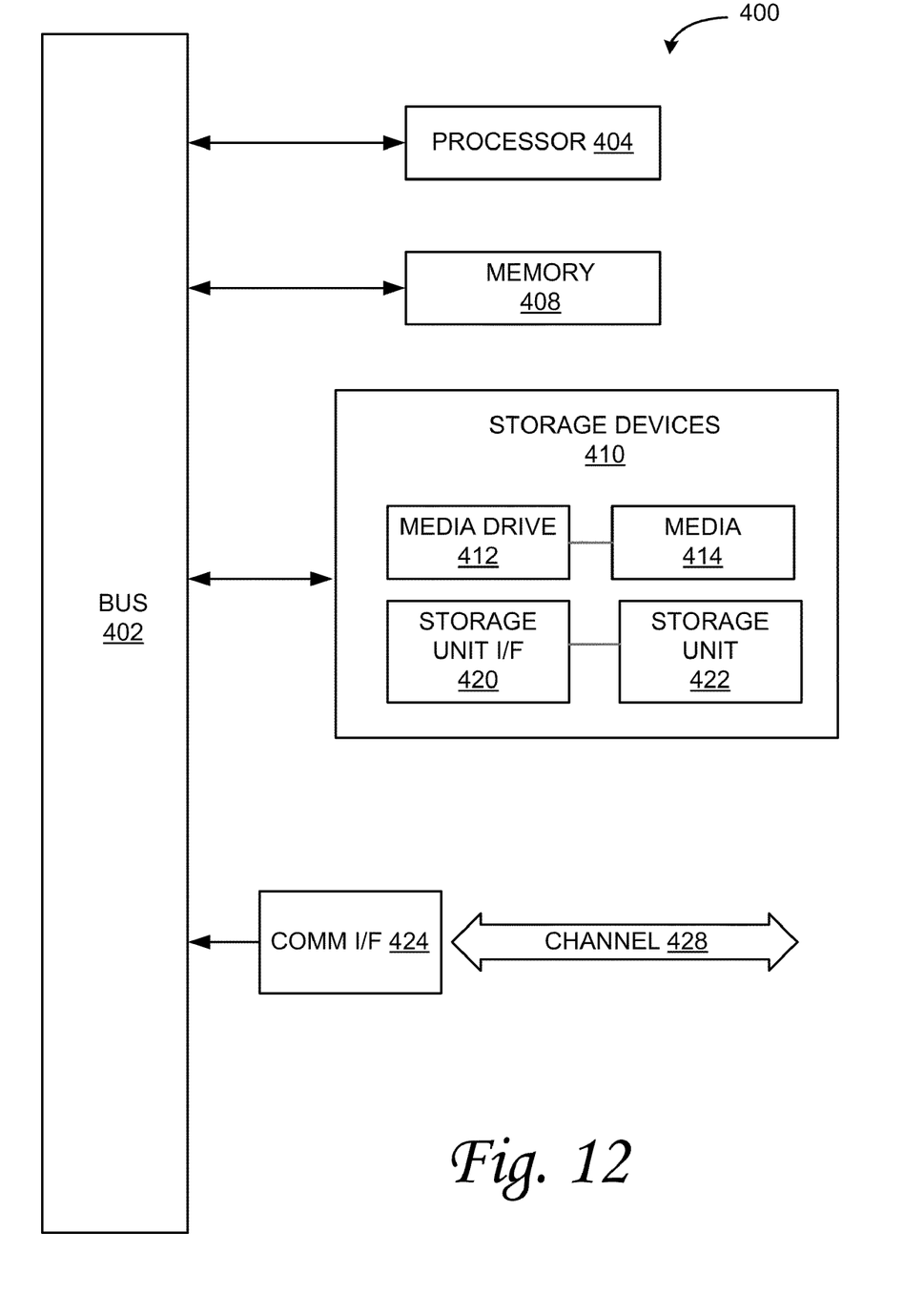
FIG. 12 illustrates an example computing module that may be used in implementing various features of embodiments of the disclosed method and apparatus.

As used herein, the term module might describe a given unit of functionality that can be performed in accordance with one or more embodiments of the disclosed method and apparatus. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the disclosed method and apparatus are implemented in whole or in part using software, in one embodiment, these software elements can be implemented to operate with a computing or processing module capable of carrying out the functionality described with respect thereto. One such example computing module is shown in FIG. 12. Various embodiments are described in terms of this example-computing module 400. After reading this description, it will become apparent to a person skilled in the relevant art how to implement the disclosed method and apparatus using other computing modules or architectures.

Referring now to FIG. 12, computing module 400 may represent, one or more processors, controllers, control modules, or other processing devices, such as a processor 404 or for example, desktop, laptop and notebook computers; handheld computing devices (PDA's, smart phones, cell phones, palmtops, etc.); mainframes, supercomputers, workstations or servers; or any other type of special-purpose or general-purpose computing devices as may be desirable or appropriate for a given application or environment. In one embodiment, a computing module might be found in other electronic devices such as, for example, digital cameras, navigation systems, cellular telephones, portable computing devices, modems, routers, WAPs, terminals and other electronic devices that might include some form of processing capability.

Processor 404 might be implemented using a general-purpose or special-purpose processing engine such as, for example, a microprocessor, controller, or other control logic. In the illustrated example, processor 404 is connected to a bus 402, although any communication medium can be used to facilitate interaction with other components of computing module 400 or to communicate externally.

Computing module 400 might also include one or more memory modules, simply referred to herein as main memory 408. For example, preferably random access memory (RAM) or other dynamic memory, might be used for storing information and instructions to be executed by processor 404. Main memory 408 might also be used for storing temporary variables or other intermediate information during execution of instructions to be executed by processor 404. Computing module 400 might likewise include a read only memory ("ROM") or other static storage device coupled to bus 402 for storing static information and instructions for processor 404.

The computing module 400 might also include one or more various forms of information storage mechanism 410, which might include, for example, a media drive 412 and a storage unit interface 420. The media drive 412 might include a drive or other mechanism to support fixed or removable storage media 414. For example, a hard disk drive, a floppy disk drive, a magnetic tape drive, an optical disk drive, a CD or DVD drive (R or RW), or other removable or fixed media drive might be provided. Accordingly, storage media 414 might include, for example, a hard disk, a floppy disk, magnetic tape, cartridge, optical disk, a CD or DVD, or other fixed or removable medium that is read by, written to or accessed by media drive 412. As these examples illustrate, the storage media 414 can include a computer usable storage medium having stored therein computer software or data.

In alternative embodiments, information storage mechanism 410 might include other similar instrumentalities for allowing computer programs or other instructions or data to be loaded into computing module 400. Such instrumentalities might include, for example, a fixed or removable storage unit 422 and an interface 420. Examples of such storage units 422 and interfaces 420 can include a program cartridge and cartridge interface, a removable memory (for example, a flash memory or other removable memory module) and memory slot, a PCMCIA slot and card, and other fixed or removable storage units 422 and interfaces 420 that allow software and data to be transferred from the storage unit 422 to computing module 400.

Computing module 400 might also include a communications interface 424. Communications interface 424 might be used to allow software and data to be transferred between computing module 400 and external devices. Examples of communications interface 424 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 424 might typically be carried on signals, which can be electronic, electromagnetic (which includes optical) or other signals capable of being exchanged by a given communications interface 424. These signals might be provided to communications interface 424 via a channel 428. This channel 428 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 408, storage unit 420, media 414, and channel 428. Additionally, the various embodiments set forth herein are described in terms of block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration. Accordingly, the particular embodiments disclosed herein should not be used to limit the scope of the claimed invention, but rather the scope of the claimed invention should be determined by the appended claims in light of the specification and without limitation to particular examples provided therein.

The invention claimed is:

1. A method for communications transmission using orthogonal frequency division multiple access on a network comprising:
   a) providing a plurality of transmitting network devices with a set of available subcarriers for orthogonal frequency division multiple access;
   b) providing a corresponding element of a pseudorandom noise sequence for each subcarrier of the set of available subcarriers;
   c) allocating a subset of the set of available subcarriers to each of the transmitting network devices;
   d) a transmitting network device of the plurality of devices mapping a packet onto a plurality of used subcarriers of its allocated subset of available subcarriers, wherein the step of mapping the packet comprises mapping the packet onto a plurality of quadrature amplitude modulated symbols to be transmitted on the used subcarriers;
   e) the transmitting network device performing a predetermined transformation on a quadrature amplitude modulated symbol using the element of the pseudorandom noise sequence corresponding to the used subcarrier;
   f) the transmitting network device transmitting the transformed symbol to a receiving network device.

2. The method of claim 1, wherein the steps of providing a corresponding element of a pseudorandom noise sequence and performing a predetermined transformation comprise:
   a) the transmitting network device receiving an initial pseudorandom noise sequence element from a pseudorandom noise sequence generator, the initial pseudorandom noise sequence element corresponding to a first available subcarrier and transforming the symbol to be transmitted on the first available subcarrier if the first available subcarrier is a used subcarrier; and
   b) the transmitting network device advancing the pseudorandom noise generator to receive a next element of the pseudorandom noise sequence corresponding to a next available subcarrier and transforming the symbol to be transmitted on the next available subcarrier if the next available subcarrier is a used subcarrier.

3. The method of claim 2, wherein the step of the transmitting network device advancing the pseudorandom noise generator is repeated until a symbol to be transmitted on a last used subcarrier is transformed.

4. The method of claim 1, wherein the pseudorandom noise sequence comprises a PN-15 sequence.

5. The method of claim 4, wherein the step of performing the predetermined transformation comprises rotating the quadrature amplitude modulated symbol by 180° if the element of the pseudorandom noise sequence is a '1' and not modifying the quadrature amplitude modulated symbol if the element of the pseudorandom noise sequence is a '0'.

6. The method of claim 4, wherein the receiving network device comprises a network coordinator and wherein the packet comprises a resource reservation request packet.

7. A method for communications reception using orthogonal frequency division multiple access on a network comprising:
   a) receiving a first scrambled orthogonal frequency division modulation symbol from a first transmitting network device, the first orthogonal frequency division modulation symbol comprising a first plurality of scrambled quadrature amplitude modulation symbols transmitted on a corresponding first plurality of used subcarriers assigned to the first transmitting network device;
   b) receiving a second scrambled orthogonal frequency division modulation symbol from a second transmitting network device, the second orthogonal frequency division modulation symbol comprising a second plurality of scrambled quadrature amplitude modulation symbols transmitted on a corresponding second plurality of used subcarriers assigned to the second transmitting network device;
   c) wherein the first plurality of subcarriers and the second plurality of subcarriers are subsets of a set of available subcarriers, and wherein the subcarriers of the set of available subcarriers have corresponding elements of a pseudorandom noise sequence; and
   d) descrambling the first and second scrambled orthogonal frequency division modulation symbols, the step of descrambling comprising descrambling a scrambled quadrature amplitude modulation symbol transmitted on a used subcarrier using the element of the pseudorandom noise sequence corresponding to the used subcarrier.

8. The method of claim 7, wherein:
   a) the step of descrambling the first and second scrambled orthogonal frequency division modulation symbols comprises receiving an initial pseudorandom noise sequence element from a pseudorandom noise sequence generator, the initial pseudorandom noise sequence element corresponding to a first available subcarrier and descrambling the symbol received on the first available subcarrier if the first available subcarrier is a used subcarrier; and
   b) advancing the pseudorandom noise generator to receive a next element of the pseudorandom noise sequence corresponding to a next available subcarrier and descrambling the symbol received on the next available subcarrier next available subcarrier is a used subcarrier.

9. The method of claim 8, wherein the step of advancing the pseudorandom noise generator is repeated until a symbol to be transmitted on a last used subcarrier is descrambled.

10. The method of claim 7, wherein the pseudorandom noise sequence comprises a 15th order pseudorandom noise sequence.

11. The method of claim 10, wherein the step of descrambling the scrambled quadrature amplitude modulated symbol comprises rotating the scrambled quadrature amplitude modulated symbol by 180° if the element of the pseudorandom noise sequence is a '1' and not modifying the scrambled quadrature amplitude modulated symbol if the element of the pseudorandom noise sequence is a '0'.

12. The method of claim 4, wherein the method is performed by a network coordinator and wherein first and second scrambled orthogonal frequency division modulation symbols are contained in a resource reservation request packet.

13. A communications network system, comprising:
   a) a network device configured to transmit a quadrature amplitude modulated symbol on a subcarrier of a set of subcarriers available for orthogonal frequency division multiple access;
   b) wherein the network device is configured to perform a constellation scrambling operation on the quadrature amplitude modulated symbol, the constellation scrambling operation comprising:
   c) initializing a sequence generator with a predetermined seed; and,
   d) while proceeding through the set of available subcarriers in a predetermined order, advancing the sequence generator for each subcarrier preceding the subcarrier, and using an element of a sequence generated by the sequence generator to scramble the quadrature amplitude modulated symbol.

14. The system of claim 13, further comprising:
   a) a second network device configured to transmit a second quadrature amplitude modulated symbol on a second subcarrier of the set of available subcarriers;
   b) wherein the second network device is configured to perform a second constellation scrambling operation on the second quadrature amplitude modulated symbol, the second constellation scrambling operation comprising:
      initializing a second sequence generator with the predetermined seed; and,
      while proceeding through the set of available subcarriers in the predetermined order, advancing the second sequence generator for each subcarrier preceding the second subcarrier, and using a second element of a second sequence generated by the second sequence generator to scramble the second quadrature amplitude modulated symbol.

15. The system of claim 14, further comprising:
   a) a receiving network device configured to receive the first and second scrambled quadrature amplitude modulated symbols;
   b) wherein the receiving network device is configured to perform a constellation descrambling operation on the first and second scrambled quadrature amplitude modulated symbols, comprising:
      initializing a third sequence generator with the predetermined seed; and,
      while proceeding through the set of available subcarriers in the predetermined order, advancing the third sequence generator for each subcarrier preceding the first subcarrier, and using the first element to descramble the first quadrature amplitude modulated symbol, advancing the third sequence generator for each subcarrier preceding the second subcarrier, and the using the second element to descramble the second quadrature amplitude modulated symbol.

16. A network device configured to transmit a quadrature amplitude modulated symbol on a subcarrier of a set of subcarriers available for orthogonal frequency division multiple access, the network device comprising a non-transitory computer readable medium having a computer executable program code embodied on the non-transitory computer readable medium, wherein the computer executable code is configured to cause the network device to perform the steps of:
   a) performing a constellation scrambling operation on the quadrature amplitude modulated symbol to form a scrambled quadrature amplitude modulated symbol, the constellation scrambling operation comprising:
      initializing a sequence generator with a predetermined seed; and,
      while proceeding through the set of available subcarriers in a predetermined order, advancing the sequence generator for each subcarrier preceding the subcarrier, and using an element of a sequence generated by the sequence generator to scramble the quadrature amplitude modulated symbol.

17. The network device of claim 16, wherein the computer executable program code is further configured to cause the device to transmit the scrambled quadrature amplitude modulated symbol to a receiving network device.

18. The network device of claim 17, wherein the receiving network device comprises a network coordinator, the sequence comprises a 15th order pseudorandom sequence, and the quadrature amplitude modulated symbol comprises an encoded symbol of a resource reservation request.

* * * * *